(12) United States Patent
Li

(10) Patent No.: US 8,348,346 B2
(45) Date of Patent: Jan. 8, 2013

(54) RECLINER WITH DUAL FUNCTIONS

(75) Inventor: Yuenian Richard Li, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 400 days.

(21) Appl. No.: 12/765,055

(22) Filed: Apr. 22, 2010

(65) Prior Publication Data

US 2011/0260516 A1 Oct. 27, 2011

(51) Int. Cl.
*B60N 2/02* (2006.01)

(52) U.S. Cl. ............. 297/378.12; 297/378.1; 297/301.3; 297/301.4; 297/364

(58) Field of Classification Search ............. 297/354.12, 297/301.3, 301.4, 364, 367 R, 378.1, 378.12
See application file for complete search history.

(56) References Cited

U.S. PATENT DOCUMENTS

| | | | |
|---|---|---|---|
| 349,907 A | | 9/1886 | Shults |
| 478,130 A | | 7/1892 | Richards et al. |
| 478,131 A | | 7/1892 | Richards et al. |
| 704,109 A | | 7/1902 | Richards |
| 911,233 A | | 2/1909 | Grode |
| 2,280,298 A | | 4/1942 | Nordmark |
| 2,582,599 A | | 1/1952 | Nordmark |
| 2,582,600 A | | 1/1952 | Nordmark |
| 2,815,065 A | | 12/1957 | Morgan et al. |
| 3,096,964 A | | 7/1963 | Fox |
| 3,156,501 A | | 11/1964 | Harris |
| 3,423,785 A | * | 1/1969 | Pickles ........................ 16/325 |
| 3,690,726 A | | 9/1972 | Van Ryn |
| 3,926,474 A | | 12/1975 | Johndrow et al. |
| 4,629,250 A | * | 12/1986 | Tezuka et al. ................. 297/362 |
| 5,413,401 A | * | 5/1995 | Koyanagi .................... 297/250.1 |
| 5,590,932 A | * | 1/1997 | Olivieri ...................... 297/367 R |
| 5,632,525 A | * | 5/1997 | Uramichi .................... 297/367 R |
| 5,803,546 A | | 9/1998 | Yamazaki |
| 6,113,190 A | * | 9/2000 | Negi et al. .................. 297/378.1 |
| 6,328,381 B1 | * | 12/2001 | Smuk ............................ 297/365 |
| 6,631,954 B2 | | 10/2003 | Amorin et al. |
| 6,902,236 B2 | * | 6/2005 | Tame ............................ 297/335 |
| 6,974,188 B2 | | 12/2005 | Turner et al. |
| 7,134,724 B2 | * | 11/2006 | Chabanne et al. ............ 297/366 |
| 7,325,873 B2 | | 2/2008 | Stewart et al. |
| 7,344,195 B2 | * | 3/2008 | Folkert et al. .............. 297/378.1 |
| 7,494,186 B2 | * | 2/2009 | Paing et al. .............. 297/378.12 |
| 7,506,933 B2 | | 3/2009 | Yamada et al. |
| 7,543,890 B1 | * | 6/2009 | Sasaki et al. ............. 297/378.12 |
| 7,547,070 B2 | | 6/2009 | Nathan et al. |
| 2003/0197410 A1 | | 10/2003 | Blair et al. |
| 2008/0315654 A1 | | 12/2008 | Boudinot et al. |
| 2009/0079246 A1 | | 3/2009 | Okura et al. |
| 2009/0174243 A1 | | 7/2009 | Nathan et al. |

\* cited by examiner

*Primary Examiner* — Laurie Cranmer
(74) *Attorney, Agent, or Firm* — Raymond L. Coppiellie; Price Heneveld LLP

(57) ABSTRACT

A vehicle seat spring assembly having an engagement post connected to one of a seat and a seat back. A coil spring includes an internal end and an external end. The external end is operably connected with the engagement post. An arcuate engagement bracket is connected to the other of the seat and the seat back. The engagement bracket includes an elongate slot adapted to operably engage the internal end of the coil spring. The internal end moves between a compression position in contact with a first end of the elongate slot corresponding to a first predetermined position of the seat back relative to the seat. A tension position is in contact with a second end of the elongate slot corresponding to a second predetermined position of the seat back relative to the seat.

20 Claims, 14 Drawing Sheets

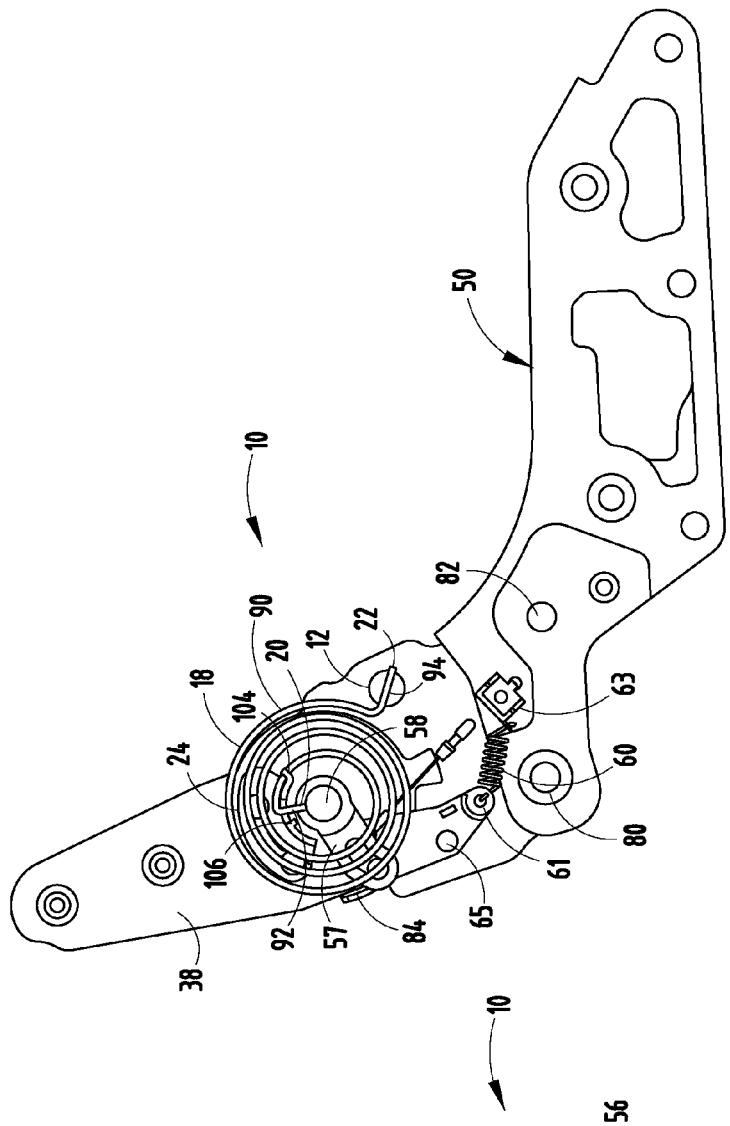
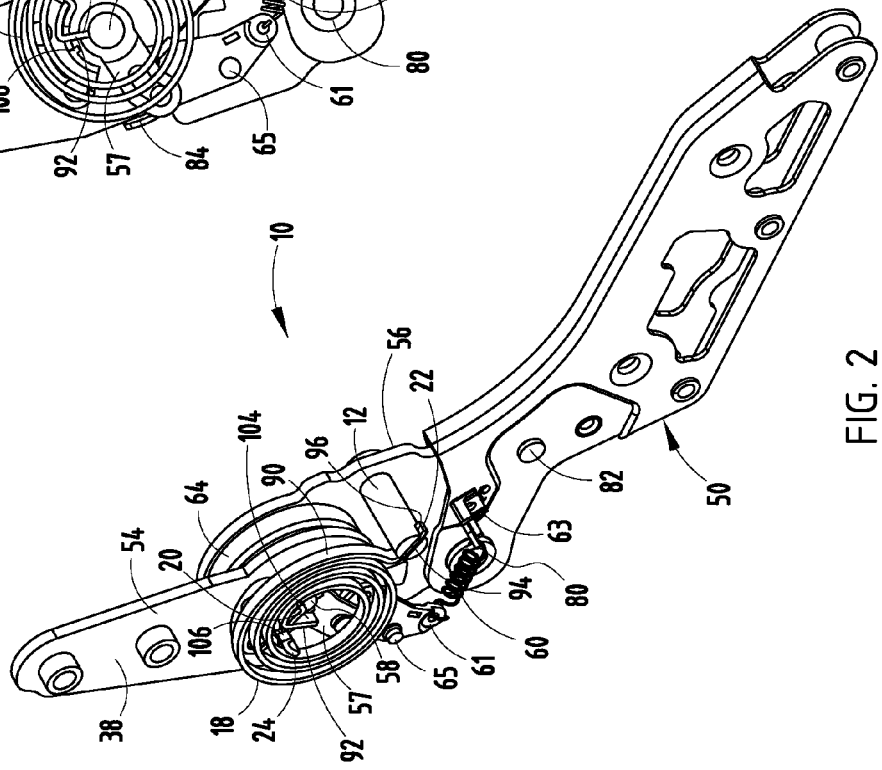
FIG. 3
FIG. 2

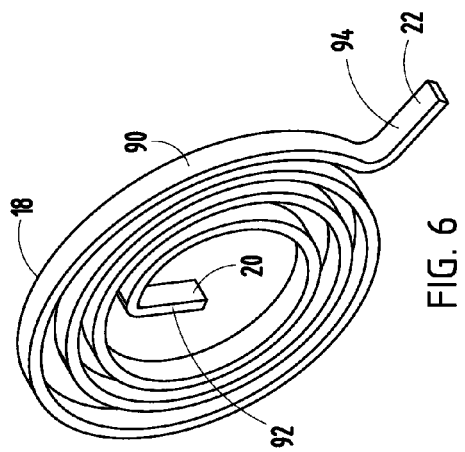
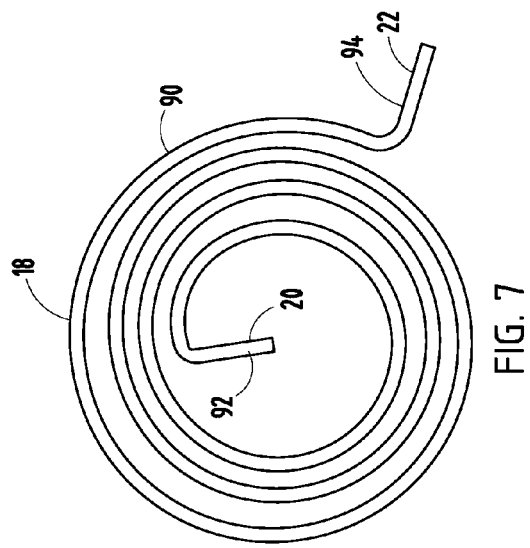
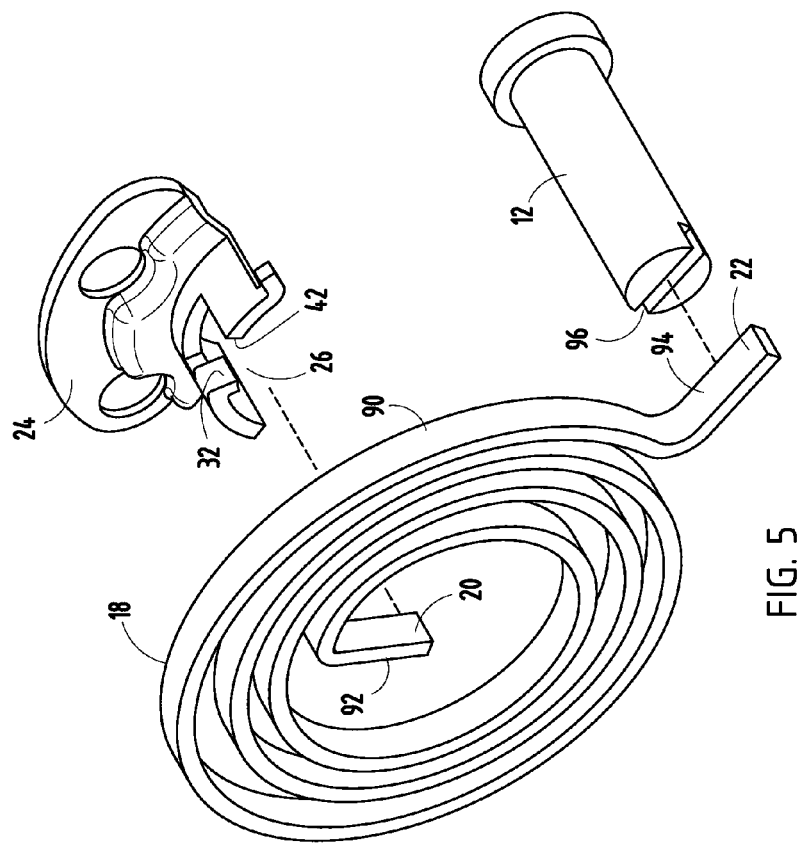

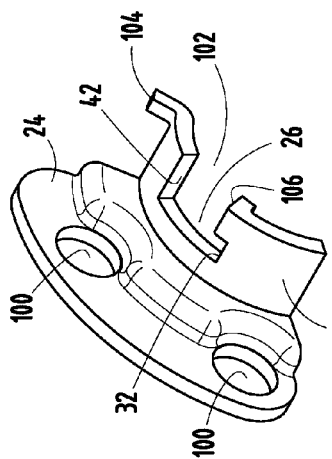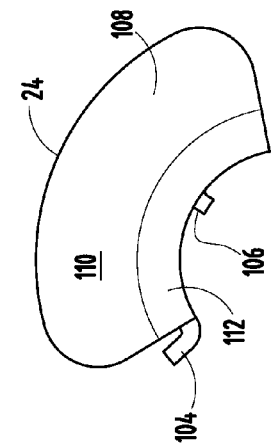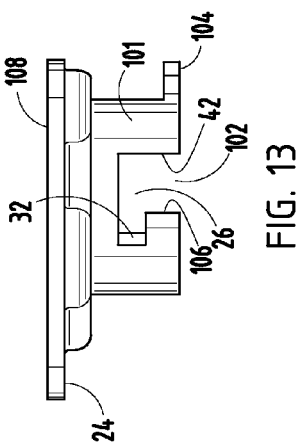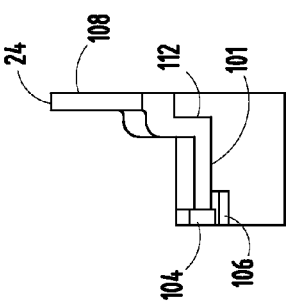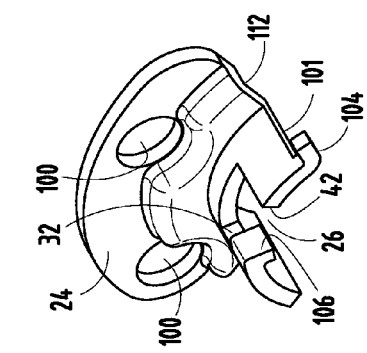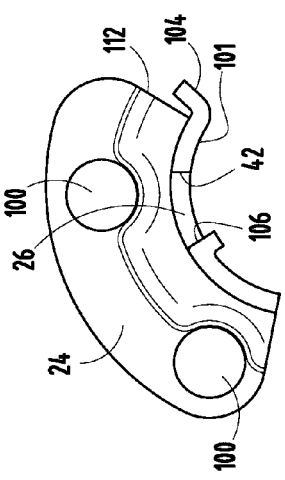

RECLINER WITH DUAL FUNCTIONS

FIELD OF THE INVENTION

The present invention generally relates to a new recliner with dual functions, and more particularly relates to a dual function vehicle seat spring assembly.

BACKGROUND OF THE PRESENT INVENTION

Spring assemblies are generally utilized in vehicles to assist in movement of seat backs from reclining to folding flat or facilitating the seat back returning to its original position.

SUMMARY OF THE PRESENT INVENTION

One aspect of the present invention includes a vehicle seat spring assembly having an engagement post connected to one of a seat and a seat back. A coil spring includes an internal end and an external end. The external end is operably connected with the engagement post. An arcuate engagement bracket is connected to the other of the seat and the seat back. The engagement bracket includes an elongate slot adapted to operably engage the internal end of the coil spring. The internal end moves between a compression position in contact with a first end of the elongate slot corresponding to a first predetermined position of the seat back relative to the seat and a tension position in contact with a second end of the elongate slot corresponding to a second predetermined position of the seat back relative to the seat.

Another aspect of the present invention includes a vehicle seat spring assembly having an engagement post connected to one of a seat and a seat back. A coil spring includes a first end and a second end. The second end is operably connected with the engagement post. An engagement bracket is connected to the other of the seat and the seat back. The engagement bracket includes an elongate slot that loosely engages the first end of the coil spring.

Yet another aspect of the present invention includes a method of making a seat spring assembly. A post is connected to one of a seat and a seat back. A first end of a spring is operably connected with the post. A bracket is connected to the other of the seat and the seat back. An elongate slot is formed in the bracket. A second end of the spring is slidably connected with the elongate slot.

These and other aspects, objects, and features of the present invention will be understood and appreciated by those skilled in the art upon studying the following specification, claims, and appended drawings.

BRIEF DESCRIPTION OF THE DRAWINGS

FIG. 2 is a top perspective view of the vehicle seat spring assembly of FIG. 1;

FIG. 3 is a side elevational view of the vehicle seat spring assembly of FIG. 2;

FIG. 5 is a top perspective view of a coil spring and an engagement bracket;

FIG. 6 is a top perspective view of the coil spring of FIG. 5;

FIG. 7 is a side elevational view of the coil spring of FIG. 5;

FIG. 8 is a top front perspective view of the engagement bracket of FIG. 5;

FIG. 9 is a top rear perspective view of the engagement bracket of FIG. 5;

FIG. 10 is a first side elevational view of the engagement bracket of FIG. 5;

FIG. 11 is a front elevational view of the engagement bracket of FIG. 5;

FIG. 12 is a second side elevational view of the engagement bracket of FIG. 5;

FIG. 13 is a top plan view of the engagement bracket of FIG. 5;

DETAILED DESCRIPTION OF EMBODIMENTS

Figure 1:
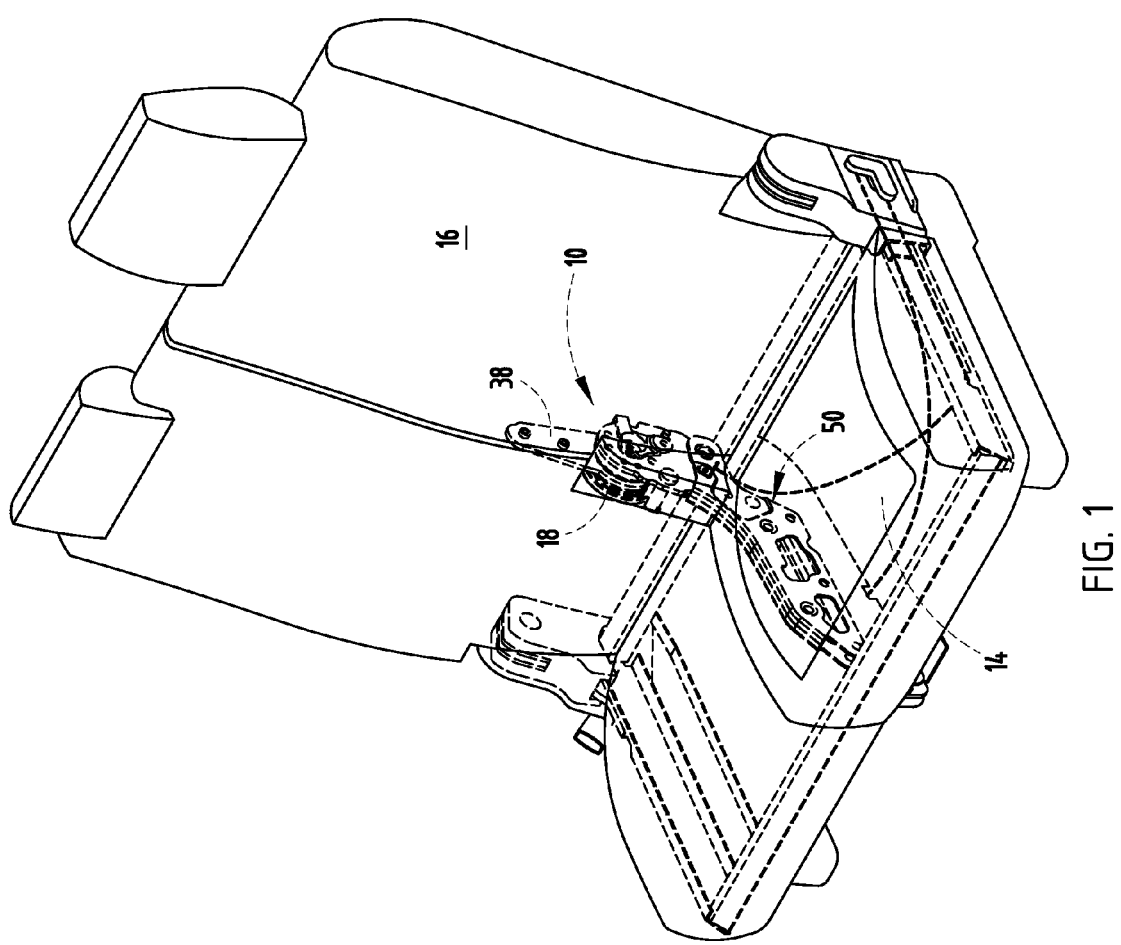
FIG. 1 is a front perspective view of one embodiment of a seat assembly having a vehicle seat spring assembly operably connected thereto.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1, 2, and 14-17A, the reference numeral 10 generally designates a vehicle seat spring assembly having an engagement post 12 connected to one of a seat 14 and a seat back 16. A coil spring 18 includes an internal end 20 and an external end 22. The external end 22 is operably connected with the engagement post 12. An arcuate engagement bracket 24 is connected to the other of the seat 14 and the seat back 16. The engagement bracket 24 includes an elongate slot 26 adapted to operably engage the internal end 20 of the coil spring 18. The internal end 20 moves between a compression position 30 in contact with a first end 32 of the elongate slot 26 corresponding to a first predetermined position 38 (folded flat) of the seat back 16 relative to the seat 14 and a tension position 40 in contact with a second end 42 of the elongate slot 26 corresponding to a second predetermined position 44 (reclined) of the seat back 16 relative to the seat 14.

Figure 4:
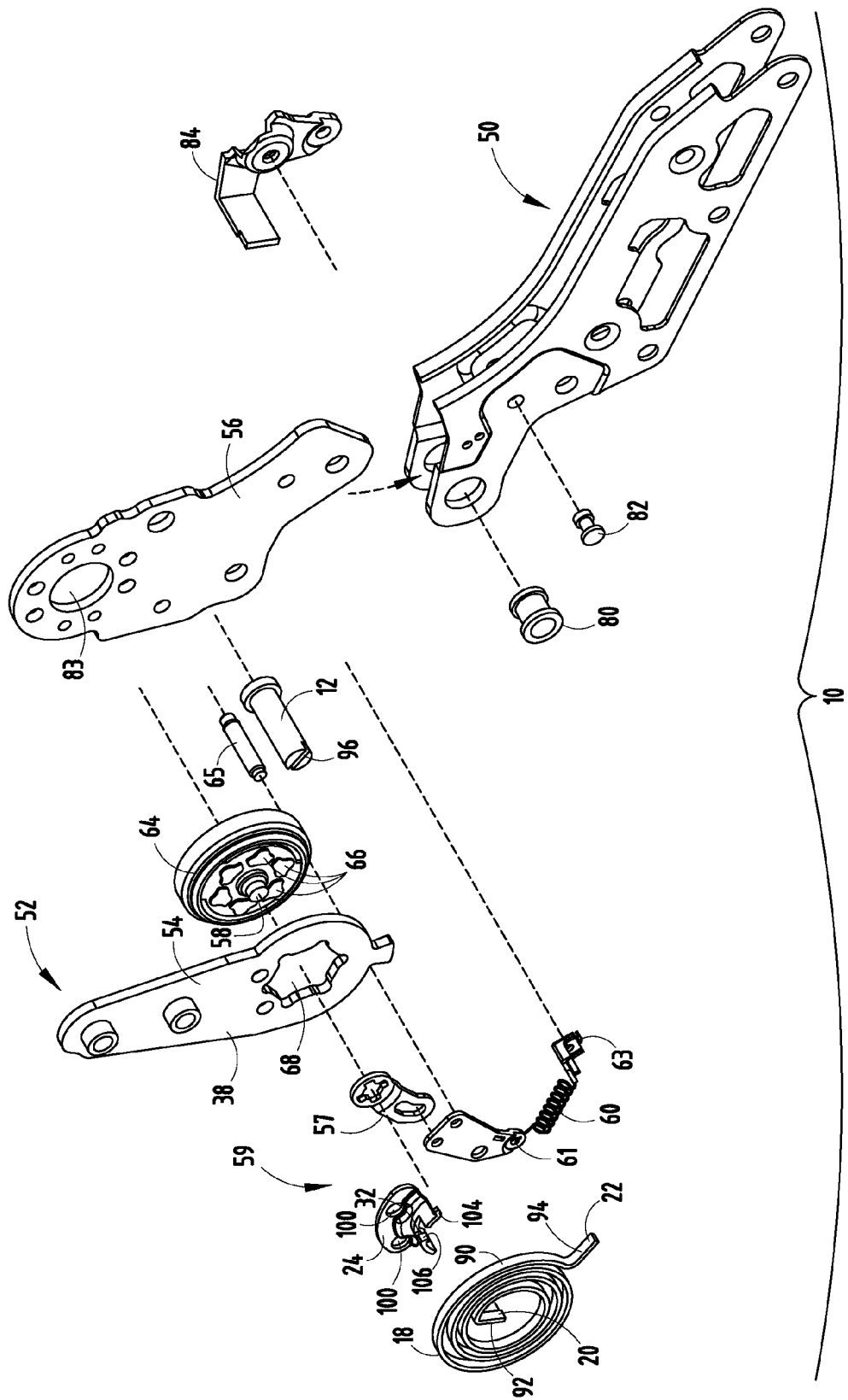
FIG. 4 is an exploded top perspective view of the vehicle seat spring assembly of FIG. 2.

Referring now to FIGS. 2-4, the vehicle seat spring assembly 10 is generally designed to be placed between the seat 14 and the seat back 16. A lower arm 50 of the vehicle seat spring assembly 10 extends adjacent to the seat 14. A pivotal upper arm 52 extends up into the seat back 16 and includes a pivotal spring engagement portion 54 and a lower arm engagement portion 56. The pivotal upper arm 52 is rotatably connected with the lower arm 50 at a pivot 58. The coil spring 18 is disposed around the lateral axis defined by pivot 58. A spring-biased latch release 59 having a locking lever 57 is disposed below the coil spring 18 and secures the seat back 16 in a variety of fixed positions relative to the seat 14. The spring-biased latch release 59 includes a spring 60 that biases the latch 59 to a latched position. To actuate the spring-biased latch release 59, a user pulls a lever (not shown) connected to the spring-biased latch release 59 against the biasing force of the spring 60 which allows the seat back 16 to move relative to the seat 14. An actuator 61 is connected to a first end of the spring 60 and a clip 63 is connected to a second end of the spring 60. The actuator 61 rotates about a pivot pin 65 between engaged and disengaged positions.

Referring again to FIG. 4, a bearing assembly 64, which biases the seat 14 forward, is disposed between the upper arm 52 and the lower arm 50 and provides for smooth rotation of the seat back 16 relative to the seat 14. The bearing assembly 64 includes a plurality of knobs 66 that interface with an aperture 68 in the upper arm 52. The lower arm engagement portion 56 is connected to the lower arm 50 by first and second mechanical fasteners 80, 82. The bearing assembly 64 fits into a receiving aperture 83 in the lower arm engagement portion 56. A connecting bracket 84 holds the lower arm engagement portion 56 in place relative to the lower arm 50.

Referring now to FIGS. 5-7, the coil spring 18 includes an elongate body 90, wherein the internal end 20 includes a linear member 92 that extends toward a center of the coil spring 18. The external end 22 of the coil spring 18 includes a linear member 94 that extends away from the center of the coil spring 18. The internal end 20 is adapted for engagement with the arcuate engagement bracket 24, and is specifically designed to be inserted inside the elongate slot 26 of the arcuate engagement bracket 24. The external end 22 is operably connected with the engagement post 12 and extends through a slot 96 in the engagement post 12. In one embodiment, the engagement post 12 is rotatably coupled with the lower arm 50 of the vehicle seat spring assembly 10 although it is contemplated that the engagement post 12 could be fixedly attached to the lower arm 50. In another embodiment the external end 22 wraps around the engagement post 12.

Referring now to FIGS. 8-13, the arcuate engagement bracket 24 includes first and second mechanical locking features 100 that secure the arcuate engagement bracket 24 to the upper arm 52 (FIG. 4) of the vehicle seat spring assembly 10. An arcuate flange 101 extends orthogonally outward from the arcuate engagement bracket 24. The elongate slot 26 is disposed in the arcuate flange 101 and includes an opening 102 adjacent the elongate slot 26 that allows the manufacturer to position the internal end 20 of the coil spring 18 into the elongate slot 26. An upwardly extending tab 104 is disposed on a forward end of the arcuate flange 101 and a lower extending tab 106 is adjacent the elongate slot 26. A backside 108 of the arcuate engagement bracket 24 has a generally planar portion 110 adapted for abutting engagement with the upper arm 52 and a recess 112.

Figure 14:
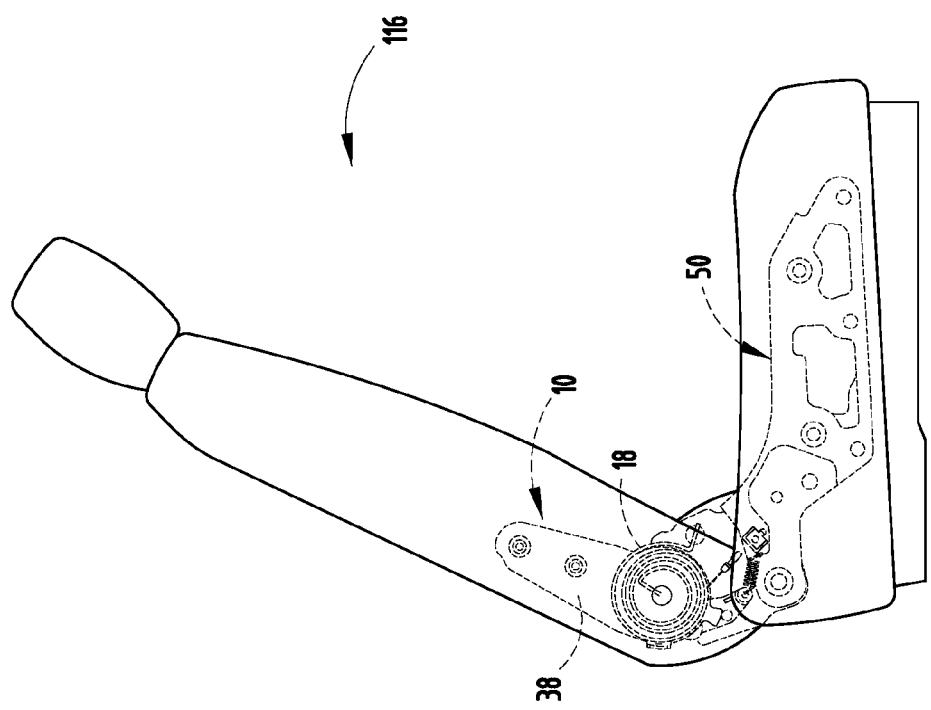
FIG. 14 is a side elevational view of a seat assembly with a seat back in a neutral position.
Figure 14A:
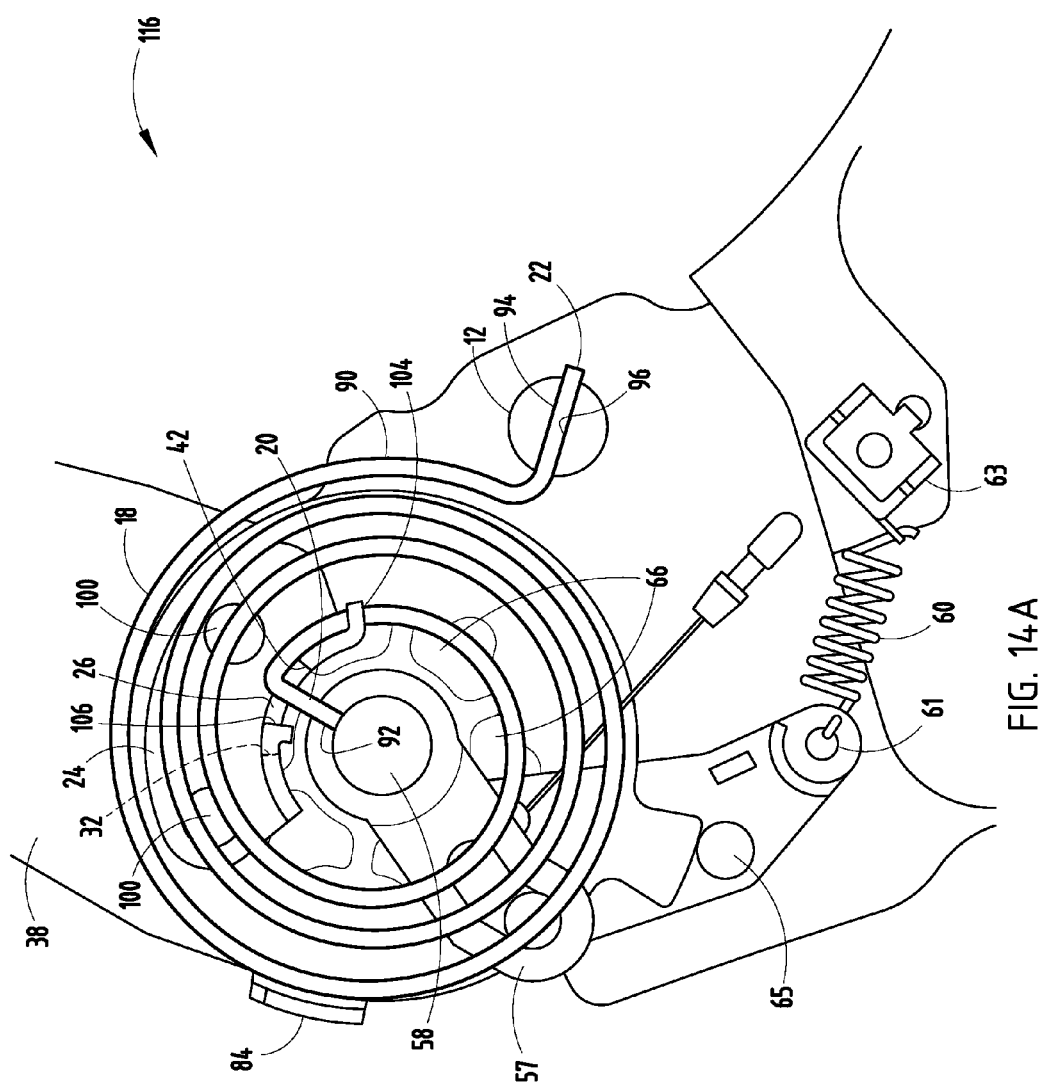
FIG. 14A is a side elevational view of a vehicle seat spring assembly when the seat back is in a neutral position.

Referring now to FIG. 14, when the seat back 16 is in a neutral position 116, the coil spring 18 is neither in compression or tension (FIG. 14A). Accordingly, the internal end 20 of the coil spring 18 is positioned between the first end 32 and second end 42 of the elongate slot 26. Accordingly, the coil spring 18 does not act on the seat back 16 relative to the seat 14. The weight of the seat back 16 is sufficient to drive the seat back 16 to a first predetermined or forward position 118.

Figure 15:
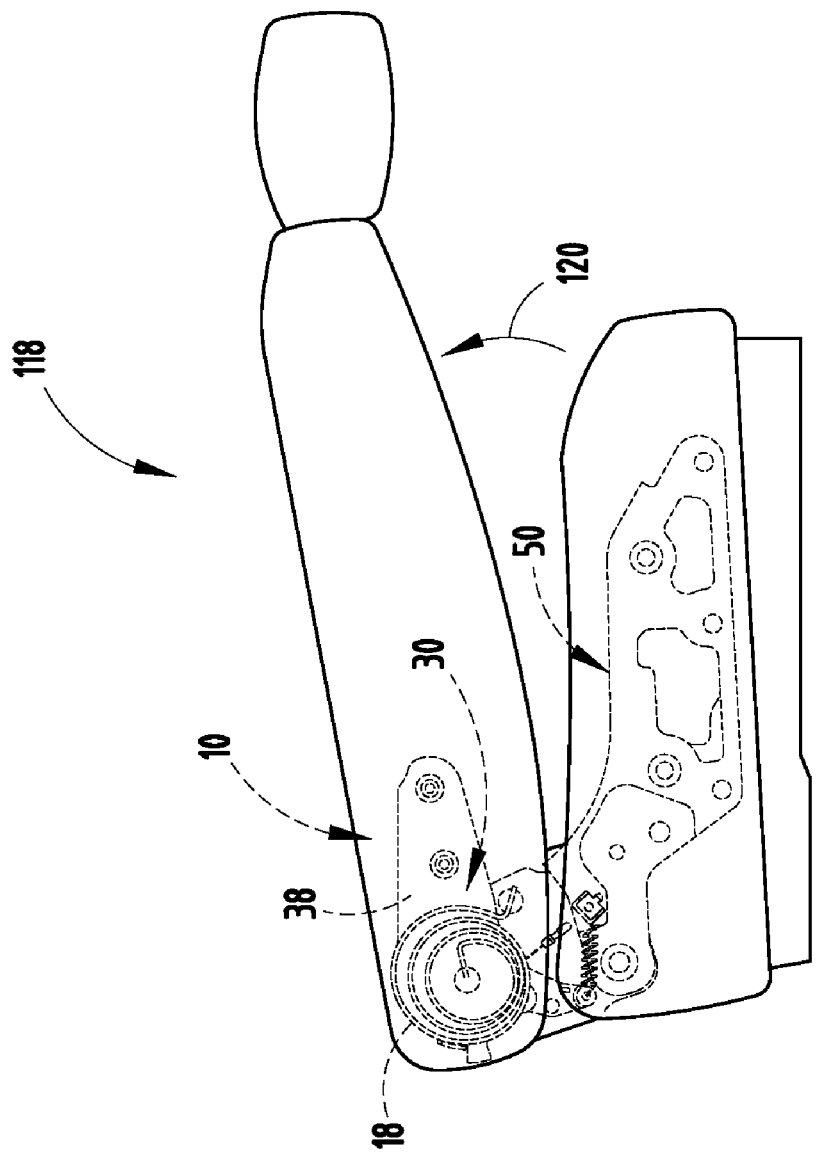
FIG. 15 is a side elevational view of a seat assembly with a seat back in a forward position.
Figure 15A:
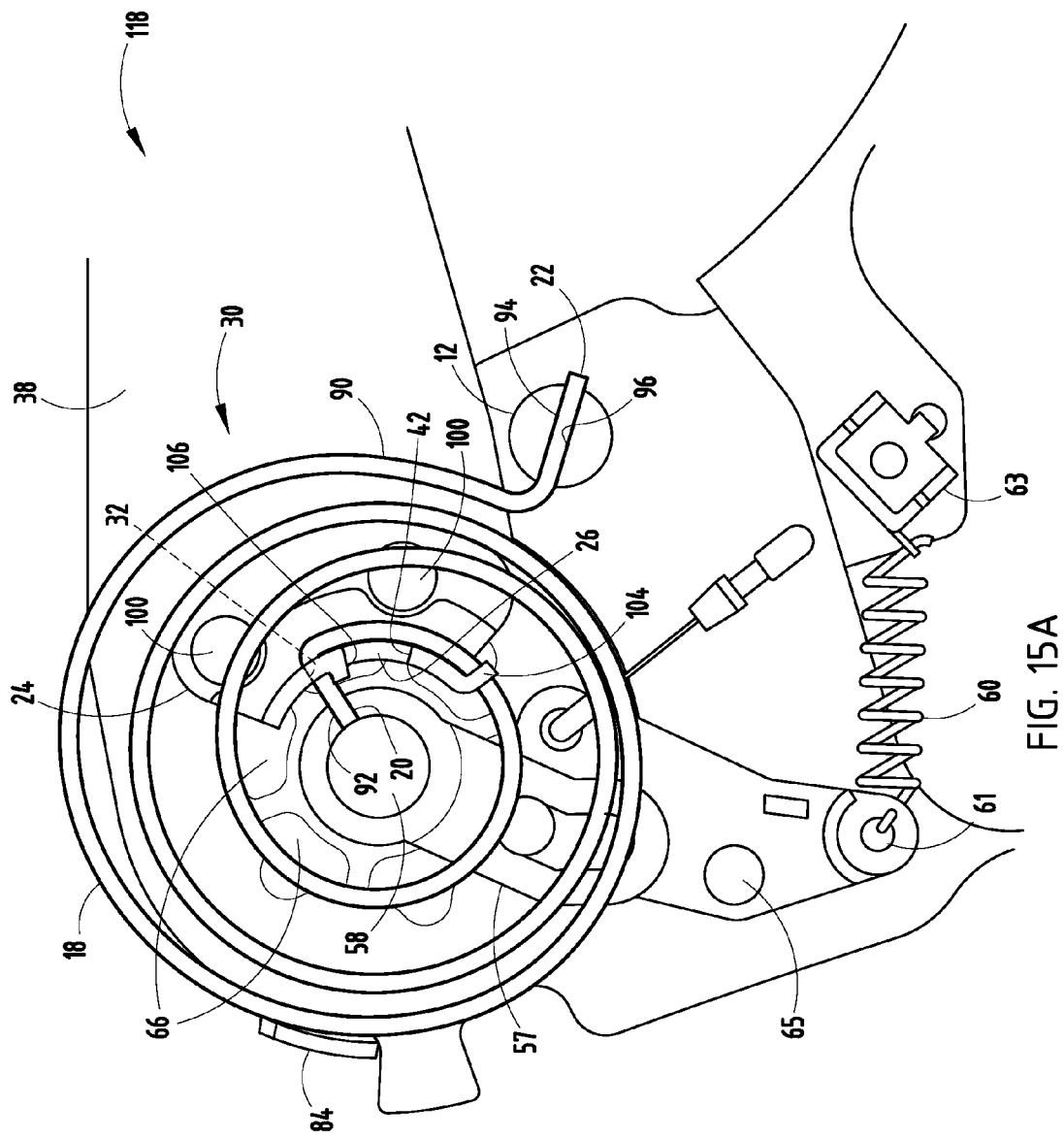
FIG. 15A is a side elevational view of a vehicle seat spring assembly when the seat back is in a forward position.

When the seat 14 is placed in the first predetermined position 118, as shown in FIGS. 15 and 15A, the coil spring 18 is placed in compression. Specifically, the first end 32 of the arcuate engagement bracket 24 interfaces with and pushes against the internal end 20 of the coil spring 18. The seat 14 is held in place by the weight of the seat back 16, however, the coil spring 18 is acting on the arcuate engagement bracket 24 in the direction of arrow 120 to, at least partially, balance the weight of the seat back 16. With the help of the compressive force of the coil spring 18, a user can more easily rotate the seat 14 to a standard position 121 (FIGS. 17 and 17A).

Figure 16:
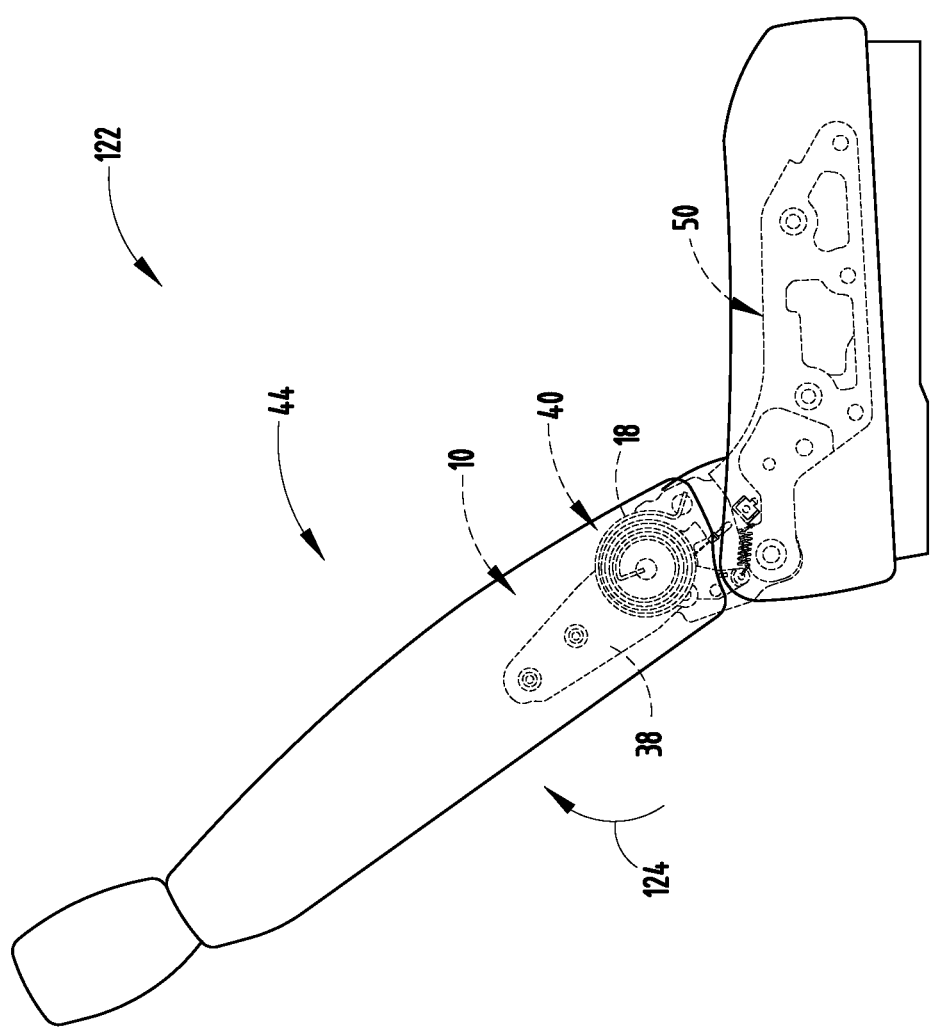
FIG. 16 is a side elevational view of a seat assembly with a seat back in a reclined position.
Figure 16A:
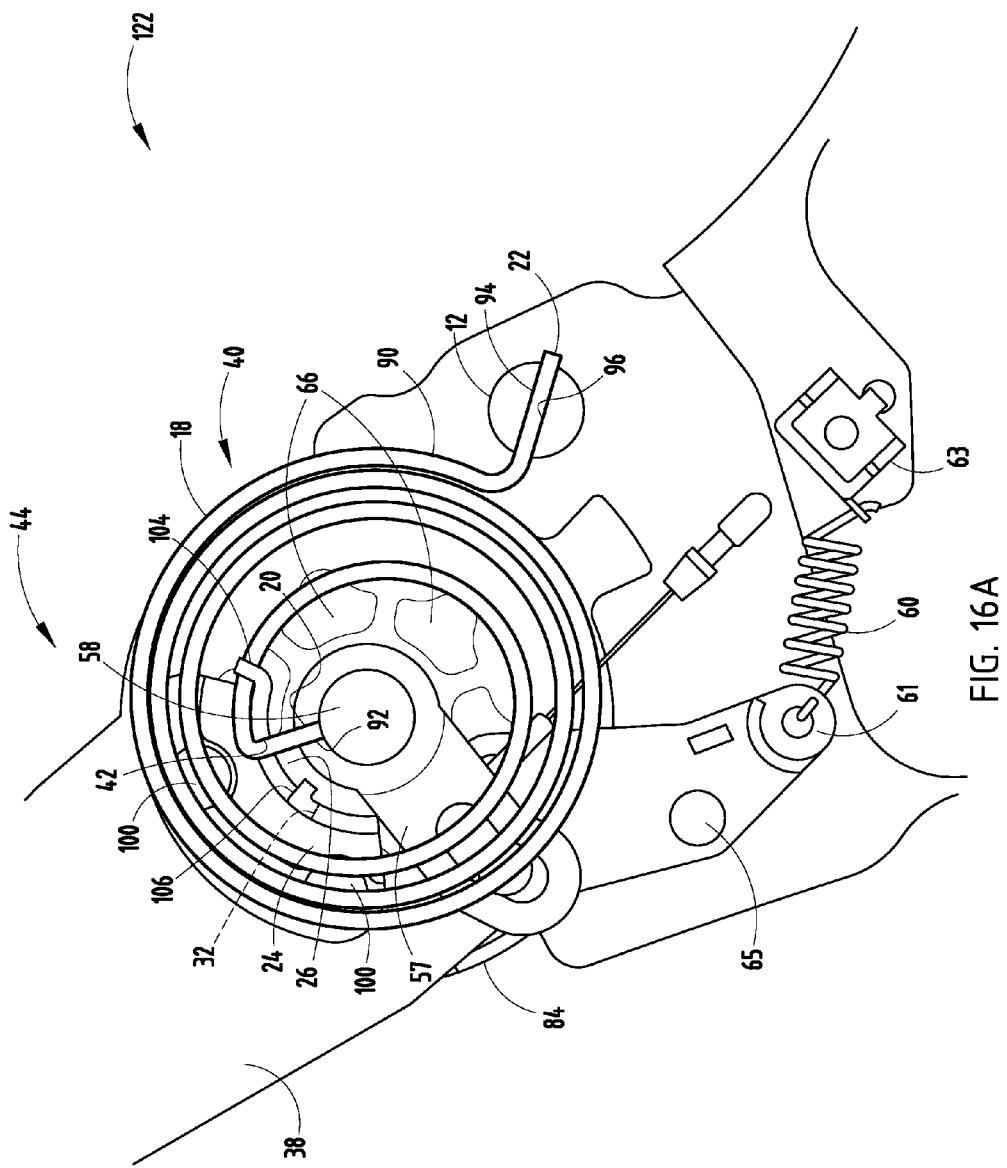
FIG. 16A is a side elevational view of a vehicle seat spring assembly with the seat back in a reclined position.
Figure 17:
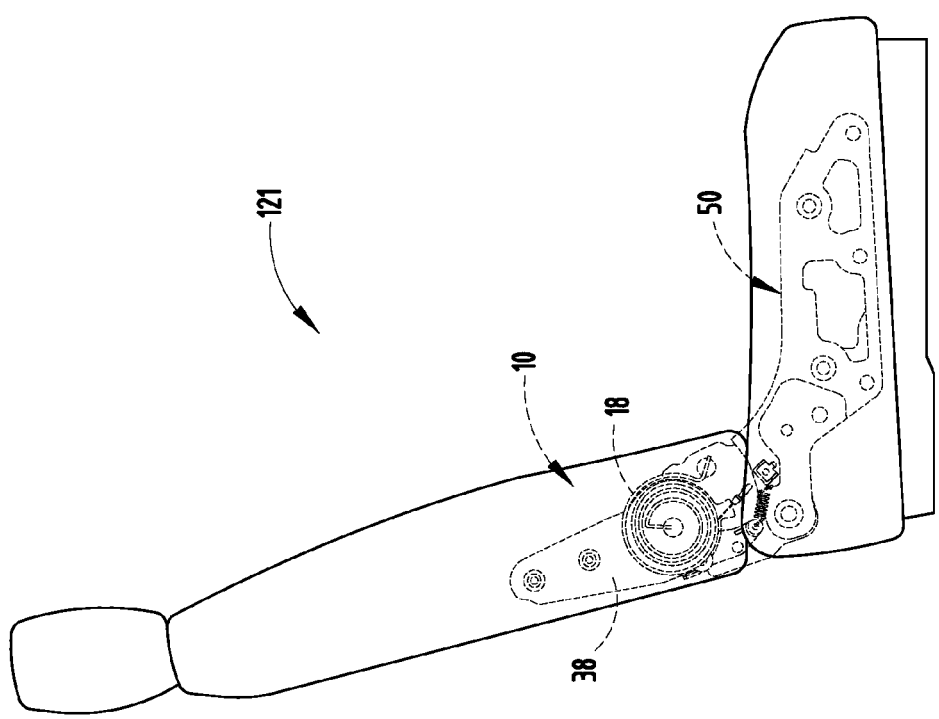
FIG. 17 is a side elevational view of a seat assembly with a seat back in a standard position.
Figure 17A:
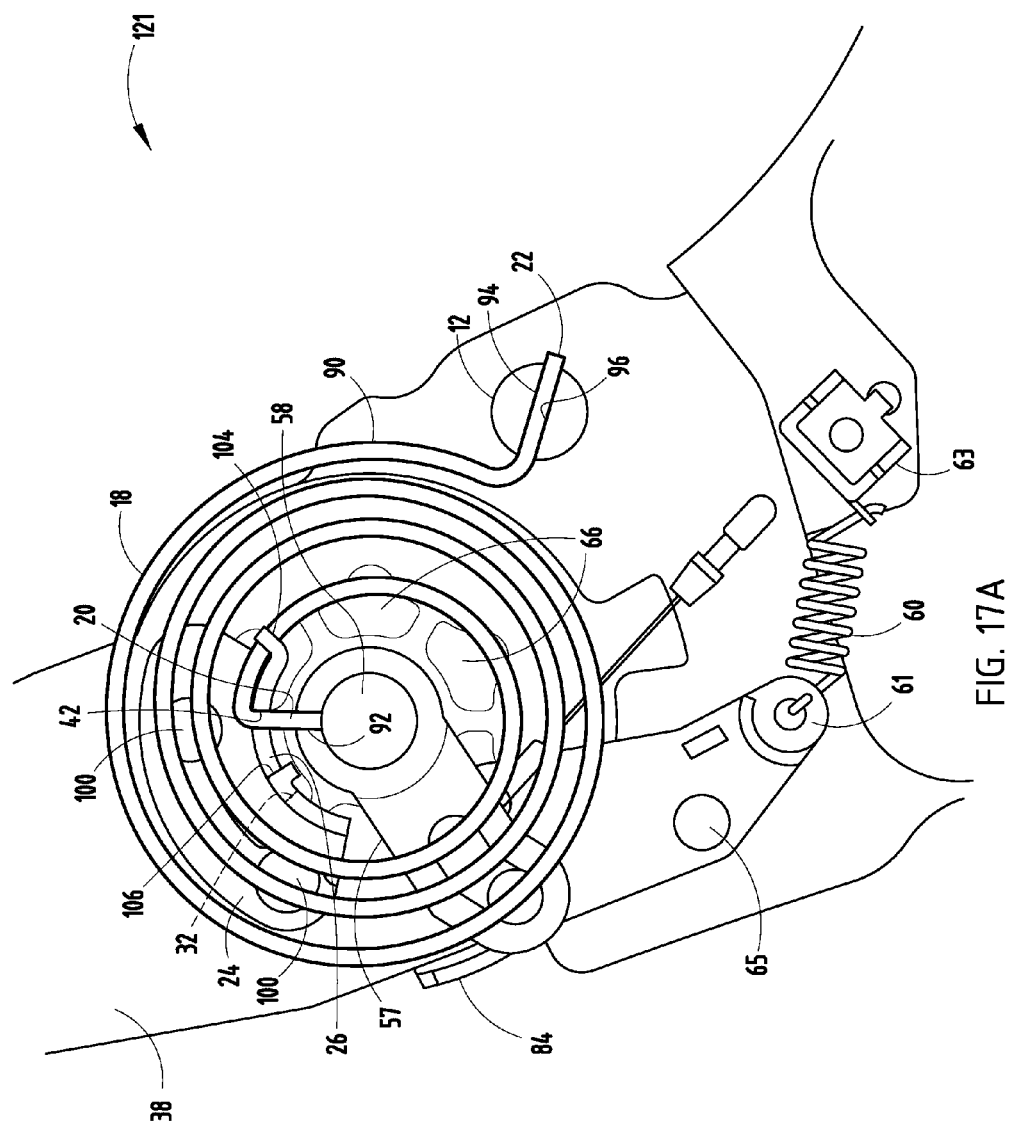
FIG. 17A is a side elevational view of a vehicle seat spring assembly with the seat back in a standard position.
Figure 18:
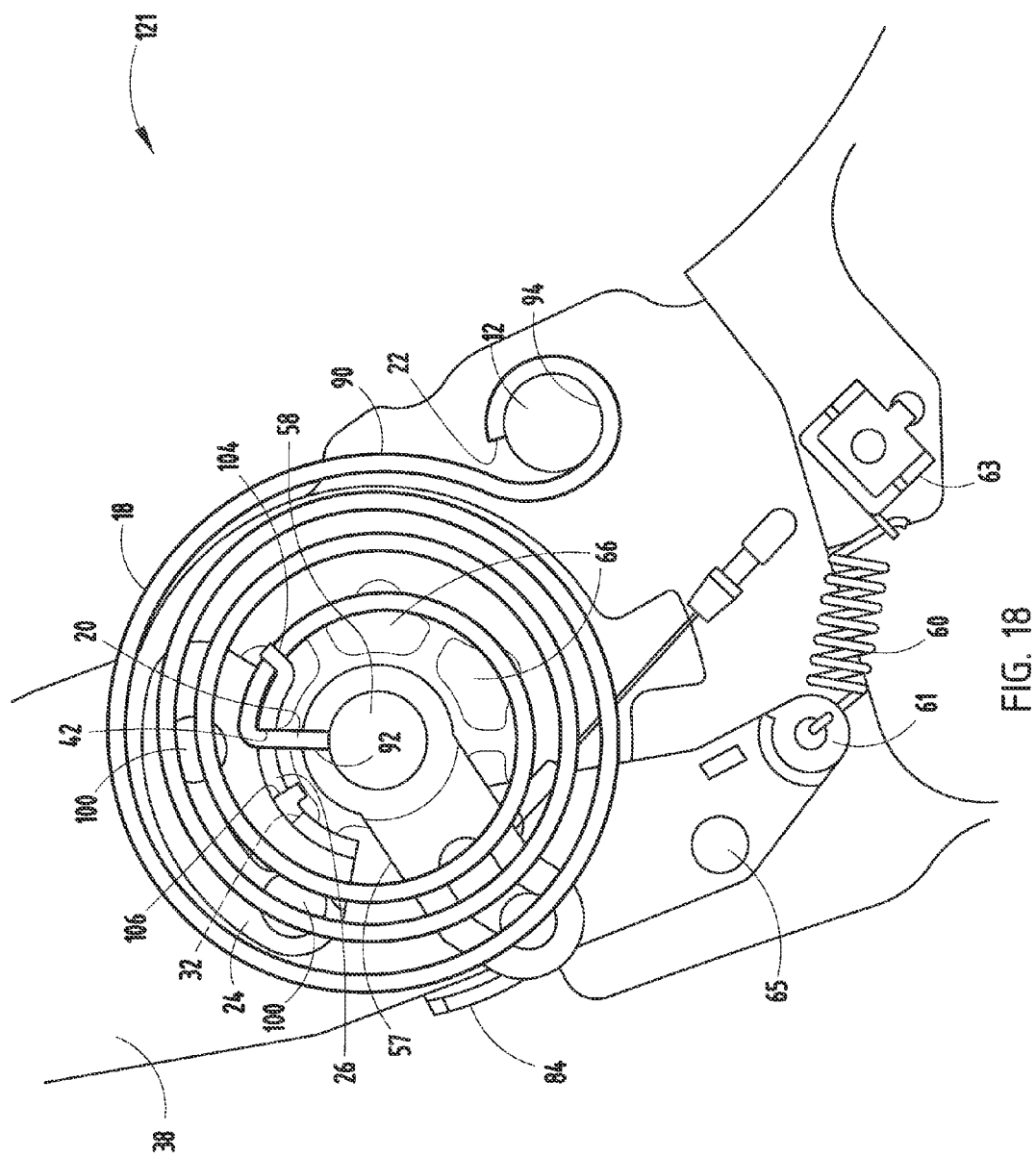

Referring now to FIGS. 16-17A, when the seat 14 is in the standard position 121 (FIG. 17) or a reclined position 122 (FIG. 16), the vehicle seat spring assembly 10 is in tension. Stated differently, the coil spring 18 is pulled, which consequently causes the coil spring 18 to pull on the arcuate engagement bracket 24, which urges the seat back 16 to the neutral position 116 relative to the seat 14. The tensile force of the coil spring 18 urges the arcuate engagement bracket 24 and the seat back 16 back to the neutral position 116 in the direction of arrow 124, which assists a user in moving the seat back 16 back to the standard position 121.

The vehicle seat spring assembly 10 is designed such that the coil spring 18 is utilized in both compression and tension. Further, the elongate slot 26 provides a predetermined range of motion of the seat back relative to the seat where no force is applied to the seat back from the coil spring 18.

The vehicle seat spring assembly 10 may be generally constructed from connecting a post to one of the seat and the seat back. An external end of a coil spring is then operably connected to the engagement post. A bracket is connected to one of the seat and the seat back and an elongate slot is formed in the bracket. An internal end of the coil spring is operably connected to the bracket. The internal end is moveable between a compression position and a tension position.

It will be understood by one having ordinary skill in the art that the vehicle seat spring assembly 10 is constructed so that both the compressive and tensile properties associated with the spring can be utilized when pivoting the seat back 16 relative to the seat 14. Further, it will be understood that the elongate slot 26 may be of varying sizes. The size of the elongate slot 26 dictates the angle the seat back 16 begins to be influenced by the bias of the vehicle seat spring assembly 10. The elongate slot 26 provides a range of motion of the seat back 16 over which the coil spring 18 does not bias the seat back 16. Further, it will be understood that the internal hinge 20 of the coil spring 18 may be operably coupled with the lower arm 50 and the external end 22 of the coil spring 18 may be operably coupled with the pivotal upper arm 52.

The vehicle seat spring assembly may be generally constructed from connecting a post to one of the seat and the seat back. An external end of a coil spring is then operably connected to the engagement post. A bracket is connected to one of the seat and the seat back and an elongate slot is formed in the engagement bracket. An internal end of the coil spring is operably connected to the engagement bracket. The internal end is movable between a compression position and a tension position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat spring assembly, comprising:
an engagement post connected to one of a seat and a seat back;

a coil spring including an internal end and an external end, wherein the external end is operably connected with the engagement post; and an arcuate engagement bracket connected to the other of the seat and the seat back, wherein the engagement bracket includes an elongate slot adapted to operably engage the internal end of the coil spring and wherein the internal end moves between:

a compression position in contact with a first end of the elongate slot corresponding to a first predetermined position of the seat back relative to the seat; and a tension position in contact with a second end of the elongate slot corresponding to a second predetermined position of the seat back relative to the seat.

2. The vehicle seat spring assembly of claim 1, wherein the seat back is in a forward pivoted position relative to the seat when the coil spring is in the compression position.

3. The vehicle seat spring assembly of claim 1, wherein the seat back is in a rearward pivoted position relative to the seat when the coil spring is in the tension position.

4. The vehicle seat spring assembly of claim 1, wherein the engagement bracket includes a body portion and a base that is distinct from the body portion.

5. The vehicle seat spring assembly of claim 1, wherein the engagement post includes an elongate slot adapted to receive the external end of the coil spring.

6. The vehicle seat spring assembly of claim 1, wherein the external end of the coil spring wraps around the engagement post.

7. A vehicle seat spring assembly, comprising:
    an engagement post connected to one of a seat and a seat back;
    a spring assembly including a first end and a second end, wherein the second end is operably connected with the engagement post; and
    an engagement bracket connected to the other of the seat and the seat back, wherein the engagement bracket includes an elongate slot that loosely engages the first end of the spring assembly.

8. The vehicle seat spring assembly of claim 7, wherein the engagement bracket has an arcuate shape.

9. The vehicle seat spring assembly of claim 7, wherein the engagement bracket includes an opening proximate to the elongate slot.

10. The vehicle seat spring assembly of claim 7, wherein the spring assembly includes a coil spring, and wherein the first end is disposed at an interior portion of the coil spring.

11. The vehicle seat spring assembly of claim 7, wherein the engagement bracket includes an arcuate flange that extends orthogonally outward from the engagement bracket.

12. The vehicle seat spring assembly of claim 7, wherein the engagement post includes a receiving slot for receiving the second end of the spring assembly.

13. The vehicle seat spring assembly of claim 7, wherein the second end of the spring assembly wraps around the engagement post.

14. The vehicle seat spring assembly of claim 7, wherein forward pivotal movement of the seat back relative to the seat causes the spring assembly to enter a state of compression and rearward pivotal movement of the seat back relative to the seat causes the spring assembly to enter a state of tension.

15. The vehicle seat spring assembly of claim 7, wherein the external end of the coil spring wraps around the engagement post.

16. The vehicle seat spring assembly of claim 7, wherein the engagement post extends from a lower arm operably coupled to the seat.

17. The vehicle seat spring assembly of claim 7, wherein the engagement bracket extends from an upper arm operably coupled to the seat back.

18. A method of making a seat spring assembly, comprising:
    connecting a post to one of a seat and a seat back;
    operably connecting a first end of a spring with the post;
    connecting a bracket to the other of the seat and the seat back;
    forming an elongate slot in the bracket; and
    slidably connecting a second end of the spring with the elongate slot.

19. The method of claim 18, wherein the step of forming an elongate slot in a bracket further comprises:
    forming an arcuate flange in the bracket.

20. The method of claim 18, further comprising:
    providing a neutral seat back range, wherein the spring does not bias the seat back.

\* \* \* \* \*